(12) United States Patent
Dey

(10) Patent No.: US 9,213,544 B2
(45) Date of Patent: Dec. 15, 2015

(54) DESKTOP SHADOWING IN A VIRTUAL DESKTOP INFRASTRUCTURE ENVIRONMENT

(71) Applicant: VMware, Inc., Palo Alto, CA (US)

(72) Inventor: Rahul Dey, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 13/858,796

(22) Filed: Apr. 8, 2013

(65) Prior Publication Data

US 2014/0304322 A1   Oct. 9, 2014

(51) Int. Cl.
*G06F 15/16* (2006.01)
*G06F 9/00* (2006.01)
*H04L 29/08* (2006.01)

(52) U.S. Cl.
CPC ............ *G06F 9/00* (2013.01); *H04L 67/141* (2013.01)

(58) Field of Classification Search
CPC ....... H04L 49/00; H04L 67/141; H04L 29/06; G06F 1/04; G06F 15/16
USPC ............ 709/203, 206; 718/1; 715/778; 708/1
See application file for complete search history.

(56) References Cited

U.S. PATENT DOCUMENTS

| | | | | |
|---|---|---|---|---|
| 5,936,860 A * | 8/1999 | Arnold | ................. | G06F 8/24 700/95 |
| 6,363,409 B1 * | 3/2002 | Hart | ................. | G06F 9/544 718/1 |
| 7,801,862 B1 * | 9/2010 | Humby | ................. | G06F 17/30286 707/662 |
| 8,307,187 B2 | 11/2012 | Chawla et al. | | |
| 2003/0149731 A1 * | 8/2003 | Ohwa | ................. | G06Q 10/107 709/206 |
| 2003/0189597 A1 * | 10/2003 | Anderson | ................. | G06F 3/0481 715/778 |
| 2005/0193245 A1 * | 9/2005 | Hayden | ................. | G06F 11/2069 714/13 |
| 2011/0185292 A1 | 7/2011 | Chawla et al. | | |
| 2011/0185355 A1 * | 7/2011 | Chawla | ................. | G06F 9/5077 718/1 |
| 2012/0089666 A1 * | 4/2012 | Goswami | ................. | G06Q 10/103 709/203 |
| 2012/0304168 A1 * | 11/2012 | Raj Seeniraj | ................. | G06F 9/4445 718/1 |
| 2013/0239014 A1 * | 9/2013 | Patil | ................. | G06F 3/0482 715/748 |

\* cited by examiner

*Primary Examiner* — Tesfay Yohannes

(57) ABSTRACT

Exemplary methods, apparatuses, and systems include a virtual desktop management (VDM) server receiving selection of a virtual desktop from an administrator device and receiving transmission of the virtual desktop from a virtual machine. The virtual desktop is generated by the virtual machine and transmitted concurrently to a remote client device and to the VDM server. The VDM server determines that the received transmission of the virtual desktop includes a policy state and, in response, provides the administrator device with limited management access to the selected virtual machine. The limited management access prevents the administrator device from accessing display data for the virtual desktop. The VDM facilitates sending a request to and receiving permission from the client device to enable the administrator device to access the display data.

20 Claims, 7 Drawing Sheets

DESKTOP SHADOWING IN A VIRTUAL DESKTOP INFRASTRUCTURE ENVIRONMENT

FIELD OF THE INVENTION

The various embodiments described herein relate to shadowing a virtual desktop. In particular, embodiments relate to shadowing a virtual desktop without running a desktop sharing application on the virtual machine.

BACKGROUND OF THE INVENTION

Shadowing a user desktop is a common practice for administrators helping to resolve desktop-related issues. For example, an administrator may remotely view and/or control the state of the user's desktop on the administrator's device concurrently with the user (while the user views the user's desktop on a separate device) in order to provide assistance. In physical and virtual desktop environments, software installed upon the user's device/virtual machine enables an administrator to shadow the user's desktop by transmitting a copy of the user's desktop display screen to the administrator's device.

In a virtual desktop infrastructure (VDI) environment, thousands of virtual desktops may be running in a data center. Centrally provisioning, updating, patching, and securing these virtual desktops, and their corresponding software, through the VDI environment provides efficiencies in computer resource management. Running a separate software process on each of these virtual desktops to enable desktop shadowing, however, can consume a significant amount of resources.

SUMMARY OF THE INVENTION

Exemplary methods, apparatuses, and systems include a virtual desktop management (VDM) server receiving selection of a virtual desktop from an administrator device and receiving transmission of the virtual desktop from a virtual machine. The virtual desktop is generated by the virtual machine and transmitted concurrently to a remote client device and to the VDM server. The VDM server determines that the received transmission of the virtual desktop includes a policy state and, in response, provides the administrator device with limited management access to the selected virtual machine. The limited management access prevents the administrator device from accessing display data for the virtual desktop.

In one embodiment, the VDM sends a request to and receives permission from the client device to enable the administrator device to access the display data. The VDM server, in response to the received permission, transmits an instruction to the virtual machine to change the policy state. The VDM server receives transmissions of the virtual desktop with changed policy state and, in response to the changed policy state, provides the administrator device with management access to the selected virtual machine including the display data.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein facilitate desktop shadowing of a virtual desktop. An administrator device is granted limited management access to the virtual desktop. The management access is limited to prevent the administrator device from accessing the virtual desktop's video data (e.g., being transmitted to and as viewed on a remote client device) without the consent of a user of the virtual desktop. The limited management access is based upon a policy setting stored within the virtual machine generating the virtual desktop. The remote client device using the virtual desktop may provide instruction to change the policy setting to enable the administrator device to receive the display data and, effectively, shadow the virtual desktop. The administrator device then has access to the virtual desktop, including the display data, as generated and transmitted by the virtual machine to the remote client device. Accessing the virtual desktop as described herein eliminates the need to run an additional application on the virtual machine to enable desktop shadowing and frees up resources for other purposes.

Figure 1:
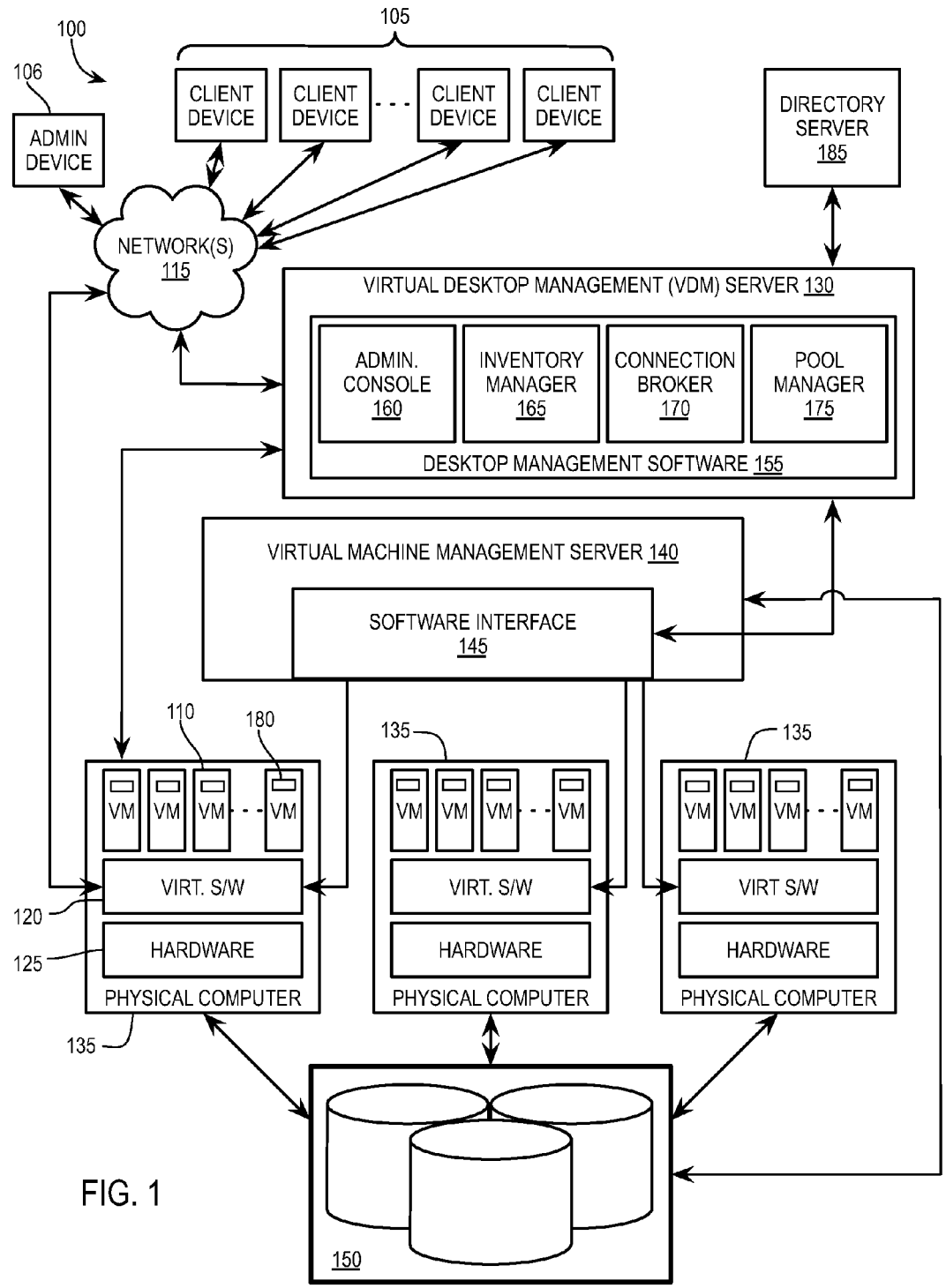
FIG. 1 illustrates, in block diagram form, an exemplary virtual desktop infrastructure environment including one or more processing systems to implement desktop shadowing.

FIG. 1 illustrates, in block diagram form, an exemplary virtual desktop infrastructure (VDI) environment 100 including one or more networked processing devices implementing virtual desktop shadowing. Server-based computing in a VDI environment allows client devices 105 to access centrally-managed user virtual desktops, such as those implemented by virtual machines (VM's) 110 running in a datacenter, via network(s) 115 (e.g., a local area network or other private or publically accessible wide area network, such as the Internet). For example, client device 105 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110.

The term "desktop," as used herein, refers to a human interface environment through which users can launch, interact with, and manage applications, settings, and/or data, etc. A virtual desktop is a virtual computing system that operates as a desktop or workstation computer with which an end user can interact using desktop remoting protocol and the software and/or hardware of client device 105. A virtualized desktop may export user interfaces, e.g., keyboard and mouse input, audio and visual output, to client device 105 from VM 110 running remotely (in the datacenter) or locally on client device 105, or, in some cases, using a hybrid. Client device 105 transmits user input, e.g., keyboard or mouse input, to VM 110 to be processed, and receives display and other data, such as sound, from VM 110 for presentation to a user of client device 105. Client device 105 presents a bitmap representation of the desktop generated by VM 110. Input to and output from the virtualized desktop are reflected in the bitmap representation on client device 105 as it occurs on the virtualized desktop within VM 110.

VM's 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of physical computer 135 manages one or more VM's 110. Virtualization software layer 120 manages physical resources, e.g., hardware 125, as well as maintains virtual-to-physical hardware mappings.

Remote access to virtualized desktops is generally provided to client devices 105 through virtual desktop management (VDM) server 130. The VDM server 130 provides virtual desktop access to the client devices 105 and manages the corresponding VMs 110 through communications with software interface 145 of virtual machine management server (VMMS) 140. VMMS 140 is responsible for provisioning and maintaining the multitude of VM's 110 implemented across one or more physical computers 135 as well as storage 150 utilized by VM's 110.

VDM server 130 may be a physical computer system or a virtual machine that runs desktop management software 155. Desktop management software 155 within VDM server 130 manages pools of computer resources to run VM's 110 on a set of clusters typically including multiple servers/physical computers 135 with central/graphics processing units (CPU's and/or GPU's), memory, and communications hardware, Desktop management software 155 includes a number of modules, including administrative console 160, inventory manager 165, connection broker 170, and pool manager 175.

Administrative console 160 provides a remotely-accessible user interface to administrator device 106 to manage the configuration of virtual desktops within the VDI. In one embodiment, administrative console 160 exports a graphical user interface via hypertext transfer protocol (HTTP) to be accessed by a web browser. Alternatively, a command-line interface or a rich client is provided to administrator device 106, which includes a web browser to access the administrative console. Administrative console 160 allows administrator device 106 to perform a plurality of functions, such as: create desktop pools, associate desktop pools with VDM server 130, associate a desktop pool with a master image, define VM state policies, setup custom messages to be sent to users (e.g., when the desktops are put into maintenance mode for weekly patches, hotfixes, etc.), set storage overcommit settings for different datastores 150 used by desktop pools, perform rebalance operations on a set of virtual desktops, and other similar operations.

Inventory manager 165 handles the events received from the virtual desktops. When a user logs off or disconnects, software agent 180 running within a VM 110 sends a notification to inventory manager 165. Inventory manager 165 determines an effective policy that applies to the desktop and performs a maintenance operation, if required. Inventory manager 165 may also use timer-based events to schedule effective maintenance operations.

Connection broker 170 allows a remote user or administrator, through a client or administrator device 105, 106, to select a type of virtual desktop and initiate a virtual desktop session or to access an existing connection to a virtual desktop. In one embodiment, connection broker 170 connects to VM 110 to access or update policies associated with VM 110 (e.g., to enable or prohibit virtual desktop shadowing).

Pool manager 175 manages the lifecycle of virtual desktops. Virtual desktops in a pool are grouped together based on similar software requirements. Desktop Administrators create logical desktops groups (desktop pools) that are provisioned typically from the same base image, including software agent 180. For example, a desktop pool may include VM's 110 that run the same set of software applications and run the same operating system.

In general, VMMS 140 provides software interface 145 to enable an administrator or other entity, such as inventory manager 165, connection broker 170, and pool manager 175, to access and manage VM's 110 as described above. Additionally, VMMS 140 supports operations for the discovery of compute, storage, and network resources; creation of logical compute pools (as discussed below) by providing features such as automatic CPU and memory load balancing; provisioning/creation of one or more virtual disks, on local or shared storage-clones with full or sparse disks; creation of virtual machines anchored to a base virtual machine-for example, linked clones using REDO disks; and power operations on virtual machines (power on, power-off, suspend, resume, checkpoint, etc.).

Directory server 185 stores a persistent state for managing the virtual desktops. For example, one or more VM's 110 (e.g., in a desktop pool) may be associated with a policy or group policy object (GPO). This policy or GPO for VM's 110 is stored in directory server 185 and accessed when VM 110 is provisioned. An exemplary policy or GPO states whether or not shadowing of the virtual desktop is allowed. In one embodiment, directory server 185 additionally contains information for one or of: names of desktop pools, the number of desktops required in a pool, default power state of a pool, pool creation date, etc.; disk type for VM 110; disk replication; details of VM's 110 created in the pools; unique identifiers for user accounts; external references to external directories; entitlements including mappings between users, applications, and desktops; policies including indications of types of devices available, default display configurations, etc.; and audit events. Directory server 185 may be an instance of Active Directory, a product available from Microsoft Corp., or may be implemented by another suitable product such as an LDAP server.

Figure 2:
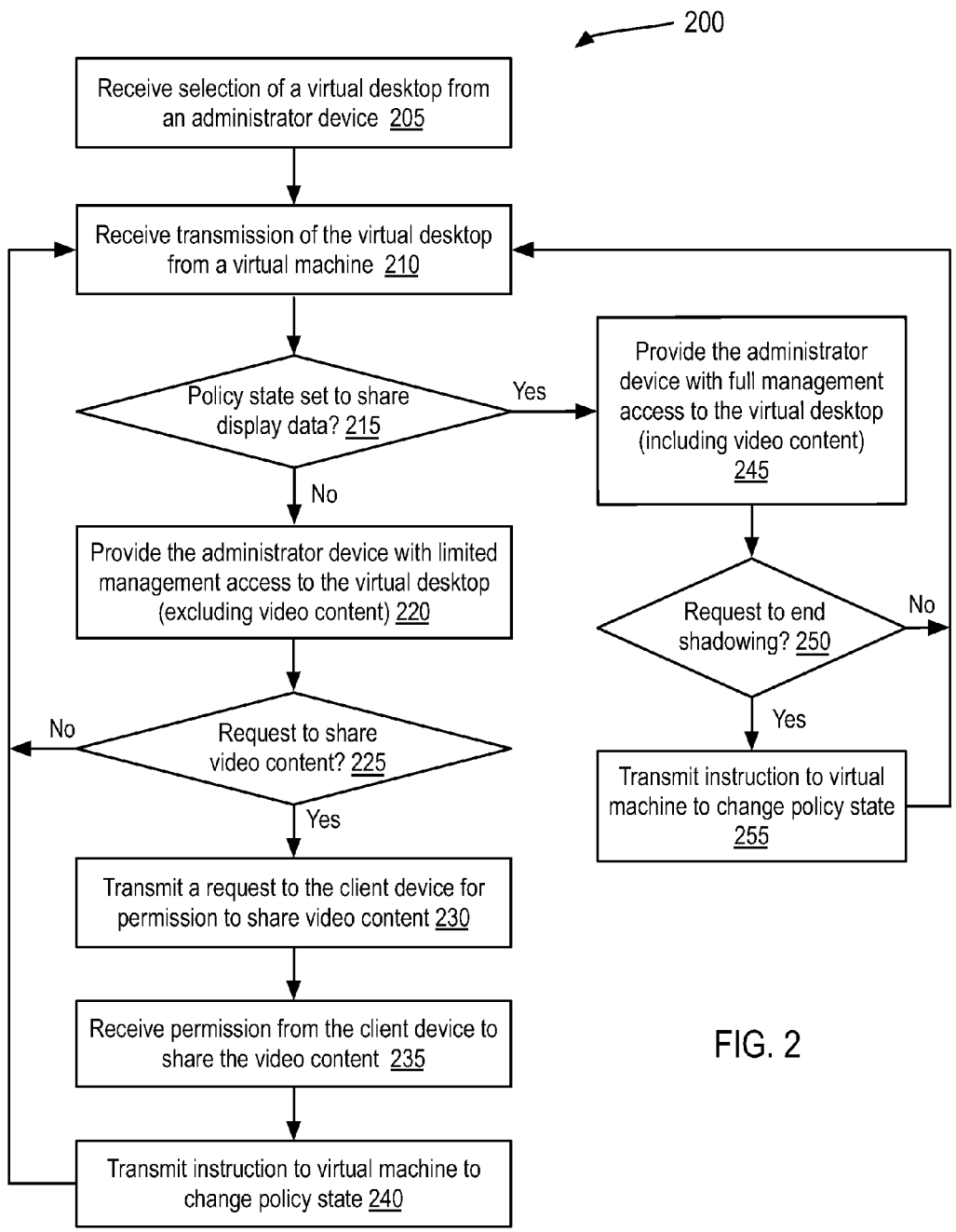
FIG. 2 is a flow chart illustrating an exemplary method of desktop shadowing in a virtual desktop infrastructure environment.

FIG. 2 is a flow chart illustrating an exemplary method 200 of desktop shadowing in a VDI environment 100. At block 205, a processing device receives selection of a virtual desktop from an administrator device. For example, an administrator may use an administrator device 106 to remotely access VDM server 130. Administrative console 160 provides a graphical user interface (GUI) to the administrator device 106 to enable the administrator to select a virtual desktop. The received selection of a virtual desktop enables VDM server 130 to receive further input from administrator device 106 for the management of the selected virtual desktop (i.e., VM 110 generating the desktop graphical user interface). Exemplary further input includes the administrator querying the current configuration of selected virtual desktop/VM 110, including versions of software, memory/storage allocation, permissions, etc. Additionally, the administrator may initiate maintenance or an upgrade of selected virtual desktop/VM 110.

Figure 3:
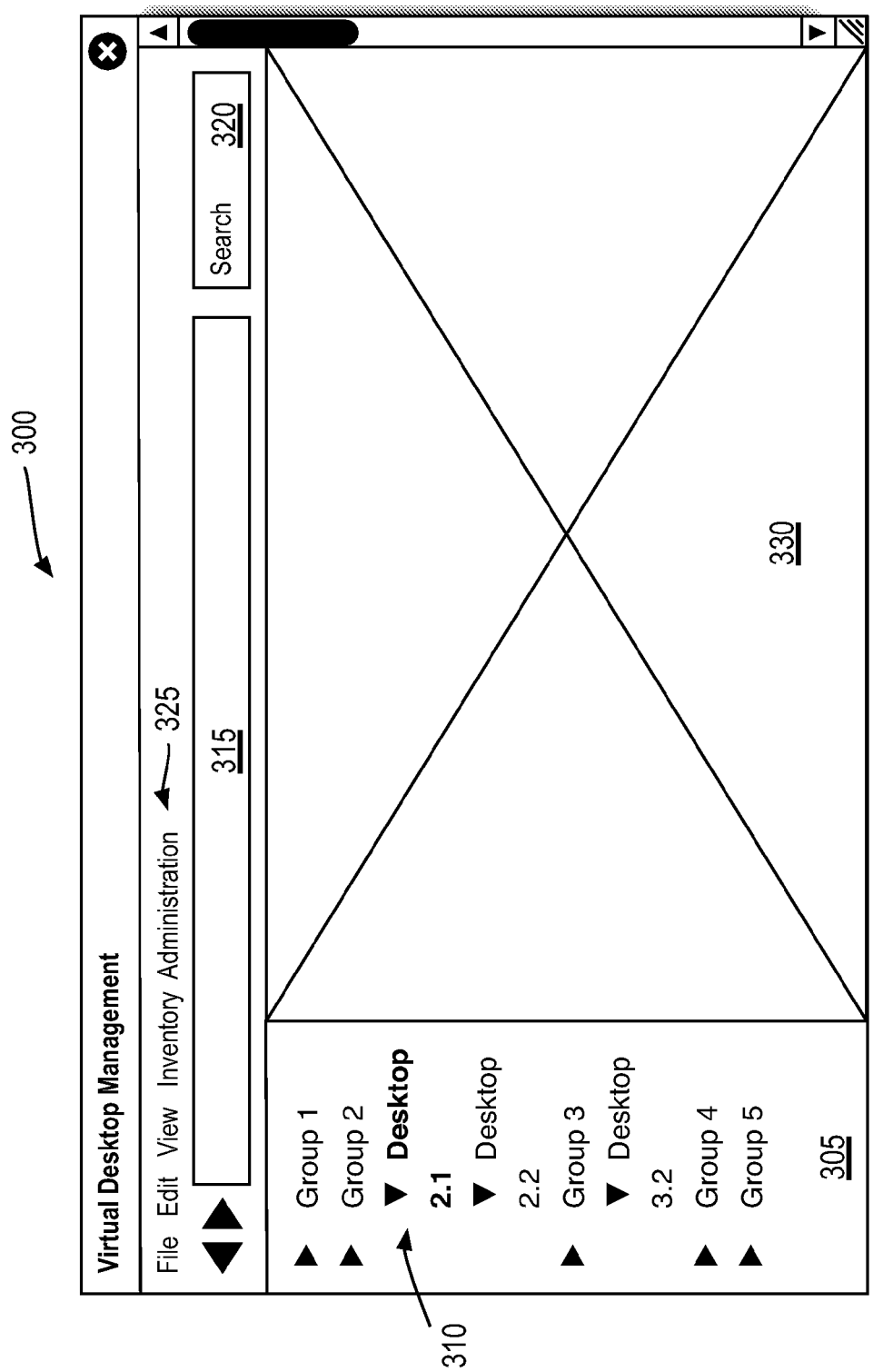
FIG. 3 illustrates an exemplary graphical user interface of an administrator device with limited management access to a virtual desktop.

FIG. 3 illustrates exemplary GUI 300 of an administrator device with management access to a virtual desktop. GUI 300 includes listing 305 of virtual desktops, desktop pools/groups, and/or user names. In one embodiment, VDM server 130 receives the administrator's selection a virtual desktop resulting from a mouse, touch input, or other cursor control within the GUI. For example, the listing of Desktop 2.1 is in a bold typeface to illustrate that Desktop 2.1 is the selected virtual desktop 310. In another embodiment, the administrator enters a virtual desktop or user name associated with a virtual desktop in text input box 315/320 to cause the GUI to display and/or select virtual desktop 310. For example, administrative console 160 may receive a user name and query inventory manager 165 to determine a virtual desktop associated with the user name.

At block 210, the processing device receives transmission of the selected virtual desktop from corresponding VM 110. In one embodiment, VDM server 130 receives from VM 110 the same/a copy of the virtual desktop data that is transmitted to the user accessing VM 110 at client device 105. Alternatively, VDM server 130 receives more or less data from VM 110 than VM 110 transmits to client device 105. In one embodiment, VDM server 130 receives the transmission in response to the selection of the virtual desktop. Alternatively, VDM server 130 receives the transmission in response to a separate command.

At block 215, the processing device determines if a policy state for the virtual desktop is set to share display data. For example, the virtual desktop data received by VDM server 130 includes a policy or GPO instructing VM 100 to allow or prohibit desktop shadowing. Alternatively, VDM server 130 determines the policy state using inventory manager 165, by querying directory server 185, or by querying VM 110.

If the policy is set to prohibit desktop shadowing, at block 220, the processing device (e.g., VDM server 130) provides administrator device 106 with limited management access to the virtual desktop. As used herein, limited management access refers to VM 110 or VDM server 130 withholding or preventing administrative access to audio and/or video data of the virtual desktop as received by the client device 105. The limited management access provides the administrator, at administrator device 106, the ability to maintain or service the selected virtual desktop while providing the user of the virtual desktop with privacy in the virtual desktop audio and/or video content.

Referring again to FIG. 3, management access GUI 300 includes a toolbar 325 to enable the administrative device to perform the administrative functions described herein while having limited administrative access. GUI 300 further includes a virtual desktop display area 330. Virtual desktop display area 330 is blank or blacked out as represented by the illustrated "X" across virtual desktop area 330. If VDM server 130 receives or otherwise has access to the video content of the virtual desktop (e.g., as received in the transmission from VM 110), VDM server 130 prevents the administrator from viewing the video content. Alternatively, virtual desktop display area 330 is blank or blacked out as a result of VDM server 130 not receiving the video content.

At block 225, the processing device determines if a request to shadow the selected virtual desktop has been received. For example, administrator device 106 may transmit such a request to VDM server 130 in response to an administrator's input within management access GUI 300 (e.g., by right clicking an identifier for the selected virtual desktop and selecting "request console view" from a pop-up context menu). If the request has not been received, the processing device continues at block 210 providing limited management access until a change in policy is detected or the request for console access is granted. Alternatively, the processing device may receive selection of another virtual desktop, returning method 200 to block 205.

Figure 4:
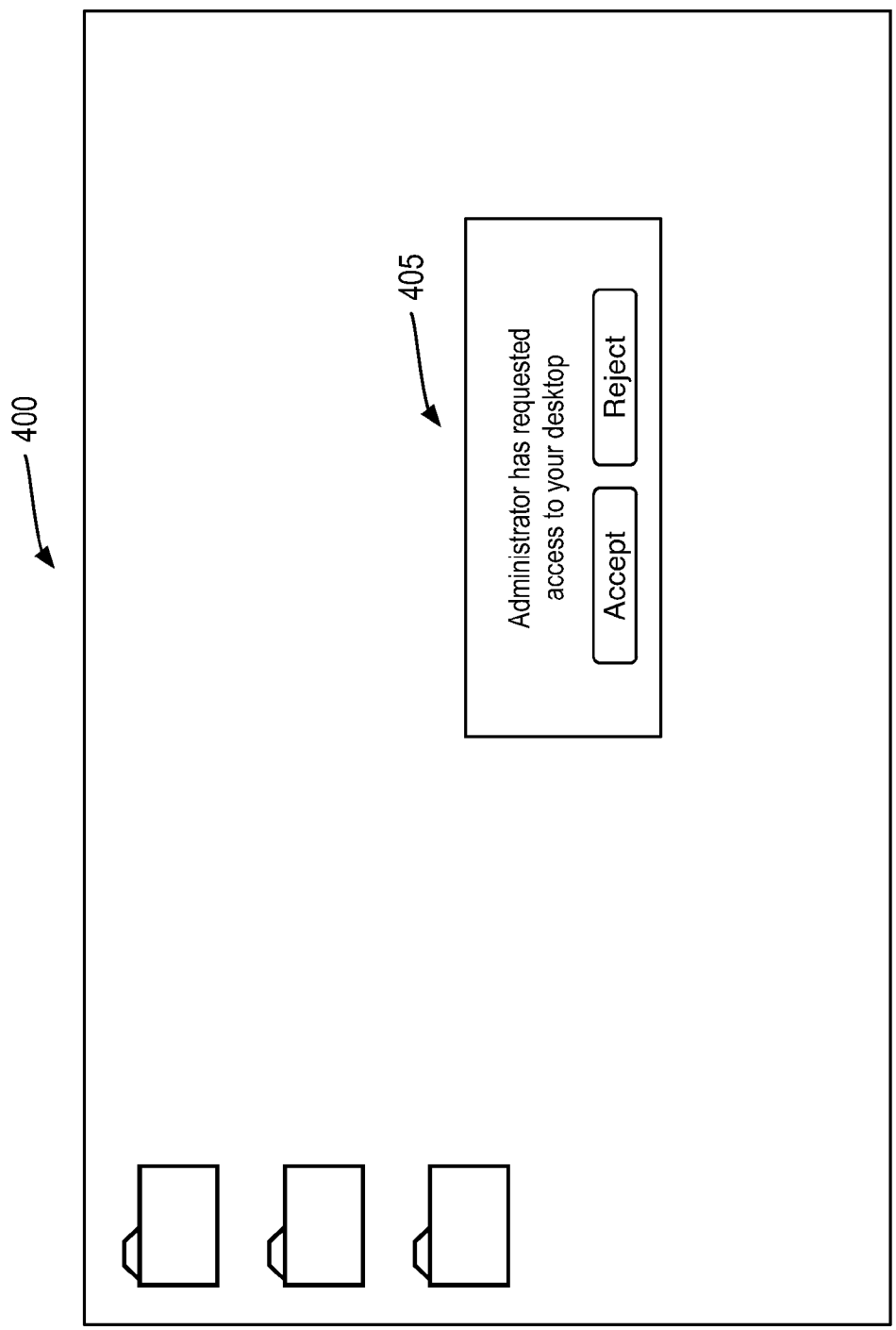
FIG. 4 illustrates an exemplary graphical user interface of a client device displaying a virtual desktop including a request to grant the administrator device access to the virtual desktop.

If the request to shadow the selected virtual desktop is received, at block 230, the processing device (e.g., VDM server 130) transmits a request to client device 105 for permission to share video content. In alternate embodiments, VDM server 130 may transmit the request to corresponding VM 110 or corresponding client device 105 to request access to the user's desktop. If the request is sent to VM 110, agent 180 running within VM 110 receives the request and displays a request message or dialog box which is displayed for the user directly on their desktop, which is then transmitted by the desktop remoting software to client device 105. The user of client device 105 is then able to grant or deny access using the dialog box and the desktop remoting software as he or she would with any software executing within VM 110. In the alternate embodiment in which the request is sent directly to client device 105, the client device may overlay the dialog box over the image presented by the client device of the user's desktop. The user can then interact with the dialog box without any involvement of VM 110 or agent 180. FIG. 4 illustrates exemplary virtual desktop GUI 400 of client device 105 displaying a virtual desktop including request 405 to grant the administrator access to the virtual desktop (e.g., to shadow the virtual desktop).

At block 235, the processing device (e.g., VDM server 130) receives permission from client device 105 (either directly or via agent 180) to share the video content or otherwise enable the shadowing of the virtual desktop in use by client device 105. For example, a user of the virtual desktop at client device 105 selects the "accept" button in request 405 or otherwise transmits permission to VDM server 130 (e.g., as initiated at client device 105 rather than in response to a request from administrator device 105).

At block 240, in response to the received permission, the processing device transmits an instruction to corresponding VM 110 to change the policy state prohibiting desktop shadowing. For example, VDM server 130 may utilize VMMS 140 to instruct VM 110 to change the virtual desktop shadowing policy. Once VM 110 or client device 105 had changed the virtual desktop shadowing policy, e.g., by agent 180 updating a corresponding entry in an operating system registry, preference setting, database, or other data structure within VM 110 and/or VDM server 130 updating the corresponding entry in directory server 185, VDM server 130 will receive transmission of the virtual desktop and determine that the policy is set to share display data at blocks 210 and 215. VDM server 130 receives from VM 110 or virtualization software 120 virtual desktop graphical user interface display data and generates a "console view" allowing the administrator at administrator device 106 the ability to view and interact with the desktop.

If the policy is set to allow desktop shadowing, at block 245, the processing device provides administrator device 106 with full management access to the virtual desktop. Full management access, as used herein, refers to administrator device 106 accessing the virtual desktop video and/or audio content through the VDM server 103, in addition to any features granted by limited management access.

Figure 5:
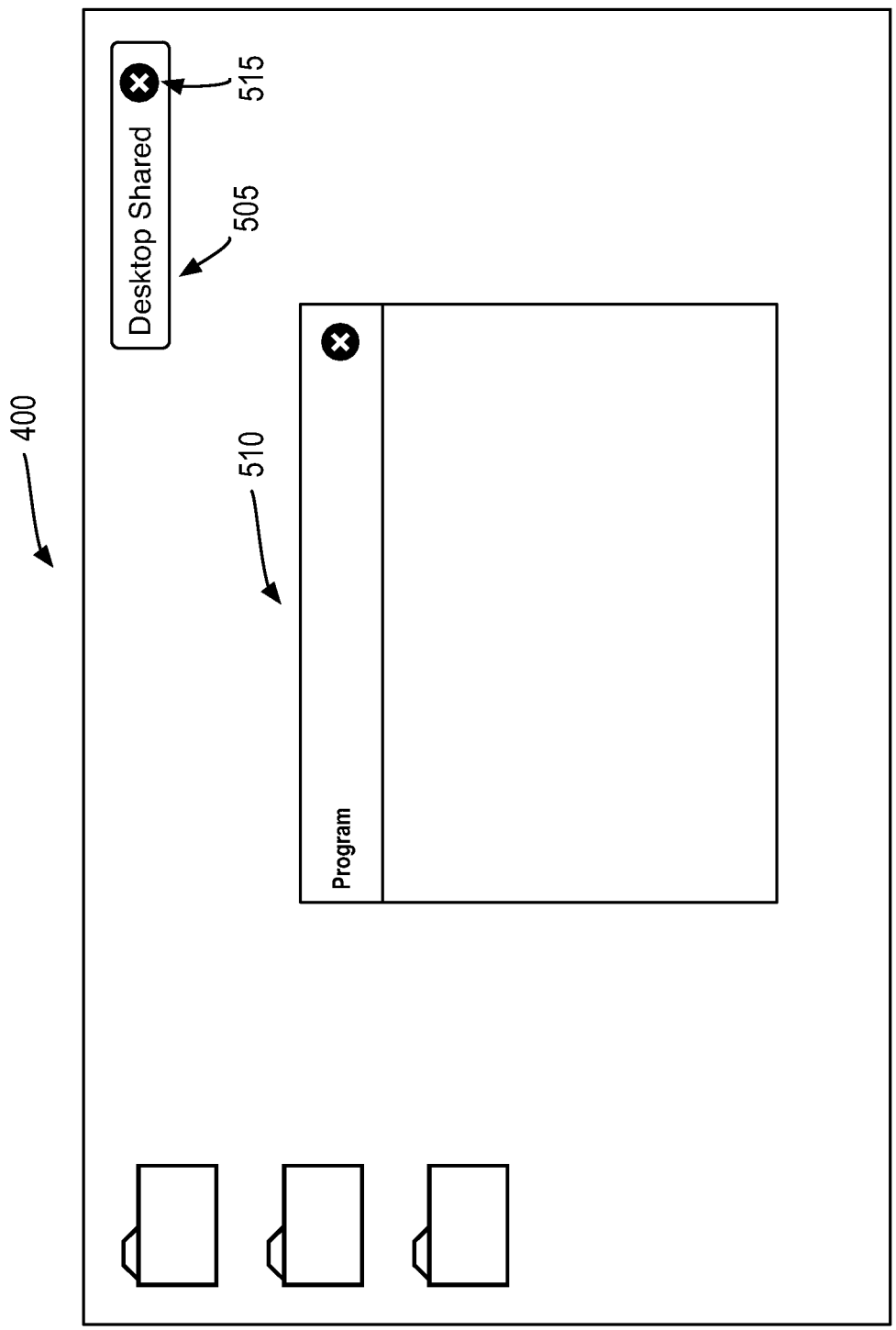
FIG. 5 illustrates an exemplary graphical user interface of the client device while sharing the virtual desktop with the administrator device.

In one embodiment, upon granting the administrator permission to shadow the virtual desktop, agent 180 in VM 110 or the client device 105 directly generates an indication to the user of the client device 105 that the virtual desktop is being shared. FIG. 5 illustrates exemplary virtual desktop GUI 400 of client device 105 while sharing the virtual desktop with the administrator. GUI 400 includes indication 505 to alert the user that an administrator is shadowing the virtual desktop. For example, the user of client device 105 may seek an administrator's assistance with program 510 running on the virtual desktop and receive indication 505 once the administrator has access to the virtual desktop.

Figure 6:
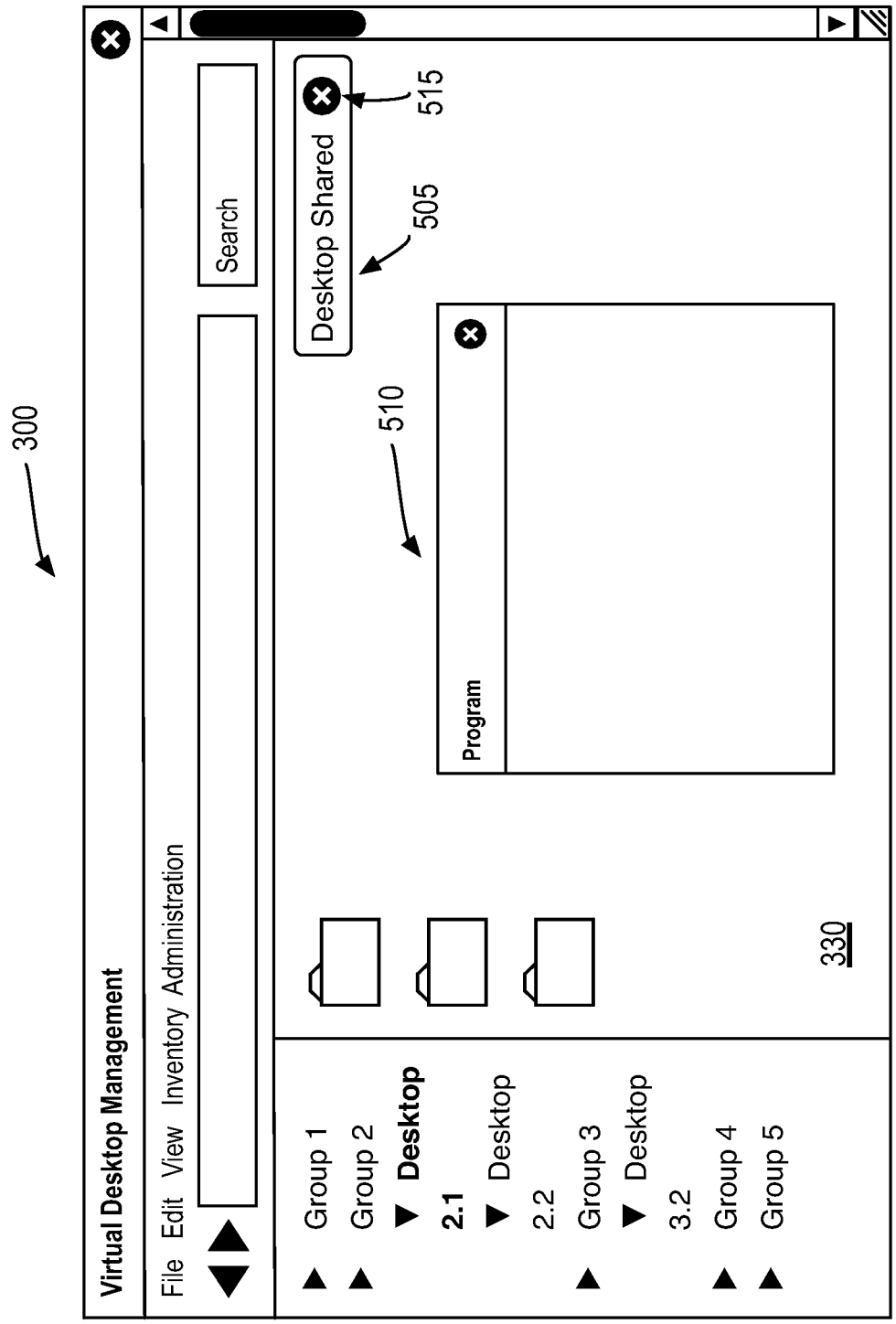
FIG. 6 illustrates an exemplary graphical user interface of the administrator device while sharing the virtual desktop with the client device.

The virtual desktop, including program 510, will be visible on administrator device 106. FIG. 6 illustrates exemplary management access GUI 300 of administrator device 106 while sharing the virtual desktop with client device 105. Virtual desktop display area 330 of management access GUI 300 now displays the virtual desktop, including indication 505 and program 510. In an alternate embodiment, indication 505 is only visible on client device 105.

In one embodiment, indication 505 that the virtual desktop is being shared includes close button 515 or other control to end the desktop shadowing session (and no longer share the video and/or audio content of the virtual desktop with administrator device 106). Alternatively, an instruction to end the desktop shadowing session is transmitted in response to another input from the user/administrator (e.g., via drop-down menu, keyboard shortcut, etc.). At block 250, the processing device determines if a request to end the shadowing session has been received. If a request to end shadowing has not been received, at block 255, the processing device continues receiving transmissions of the virtual desktop and providing administrator device 106 with full management access. When a request to end shadowing is received, from either client device 105 or administrator device 106, processing device (e.g., VDM server 130) transmits an instruction to VM 110 to change the desktop shadowing policy to prohibit shadowing once again at block 255. Upon detection of the changed policy, VDM server 130 will return to administrator device 106 to limited management access.

Figure 7:
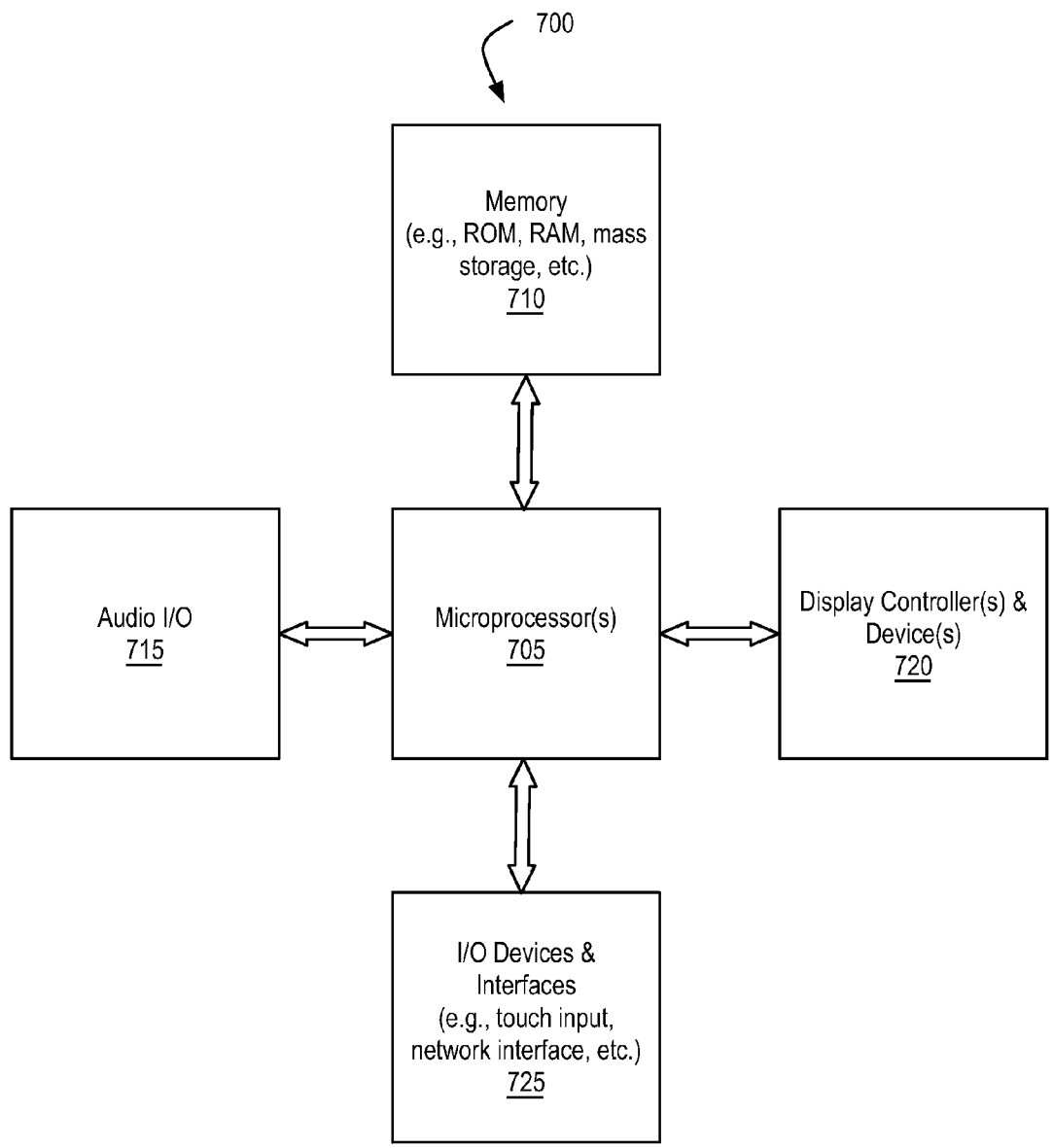
FIG. 7 illustrates, in block diagram form, an exemplary processing system to implement shadowing in a virtual desktop infrastructure environment.

FIG. 7 illustrates, in block diagram form, exemplary processing system 700 to perform shadowing in a virtual desktop infrastructure environment. Data processing system 700 includes one or more microprocessors 705 and connected system components (e.g., multiple connected chips). Alternatively, data processing system 700 is a system on a chip.

Data processing system 700 includes memory 710, which is coupled to microprocessor(s) 705. Memory 710 may be used for storing data, metadata, and programs for execution by microprocessor(s) 705. Memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 710 may be internal or distributed memory.

Data processing system 700 may also include audio input/output subsystem 715 which may include a microphone and/or a speaker for, for example, playing back music or other audio, receiving voice instructions to be executed by microprocessor(s) 705, playing audio notifications, etc. A display controller and display device 720 provides a visual user interface for the user.

Data processing system 700 also includes one or more input or output ("I/O") devices and interfaces 725, which are provided to allow a user to provide input to, receive output from, and otherwise transfer data to and from the system. These I/O devices 725 may include a mouse, keypad or a keyboard, a touch panel or a multi-touch input panel, camera, optical scanner, network interface, modem, other known I/O devices or a combination of such I/O devices.

I/O devices and interfaces 725 may also include a port, connector for a dock, or a connector for a USB interface, FireWire, Thunderbolt, Ethernet, Fibre Channel, etc. to connect system 700 with another device, external component, or a network. Exemplary I/O devices and interfaces 725 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 700 with another device, external component, or a network and receive stored instructions, data, tokens, etc.

It will be appreciated that one or more buses, may be used to interconnect the various components shown in FIG. 7.

Data processing system 700 is an exemplary representation of one or more of client device 105, administrator device 106, VDM server 130, physical computer 135, VMMS 140, and directory server 185 described above. Data processing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 700 may be a network computer, server, or an embedded processing device within another device or consumer electronic product. As used herein, the terms computer, device, system, processing system, processing device, and "apparatus comprising a processing device" may be used interchangeably with data processing system 700 and include the above-listed exemplary embodiments.

It will be appreciated that additional components, not shown, may also be part of system 700, and, in certain embodiments, fewer components than that shown in FIG. 7 may also be used in a data processing system 700. It will be apparent from this description that aspects of the inventions may be embodied, at least in part, in software. That is, computer-implemented method 200 may be carried out in a computer system or other data processing system 700 in response to its processor or processing system 705 executing sequences of instructions contained in a memory, such as memory 710 or other non-transitory machine-readable storage medium. The software may further be transmitted or received over a network (not shown) via network interface device 725. In various embodiments, hardwired circuitry may be used in combination with the software instructions to implement the present embodiments. Thus, the techniques are not limited to any specific combination of hardware circuitry and software, or to any particular source for the instructions executed by data processing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   receiving, by a virtual desktop management (VDM) server from an administrator device, selection of a virtual desktop;
   receiving, by the VDM server from a virtual machine, transmission of the virtual desktop, wherein the transmission of the virtual desktop includes display data representing a visual user interface for the virtual desktop running on the virtual machine, and wherein the display data is transmitted concurrently to a remote client device and to the VDM server;
   determining, by the VDM server, that the received transmission of the virtual desktop includes a policy state; and
   providing, by the VDM server to the administrator device, management access to the selected virtual machine while, in response to the detected policy state, preventing the administrator device from accessing the display data for the virtual desktop running on the virtual machine.

2. The computer-implemented method of claim 1, further comprising:
   receiving, by the VDM server from the client device, permission to share the virtual desktop display data with the administrator device;
   transmitting, from the VDM server in response to the received permission, an instruction to the virtual machine to change the policy state;
   receiving, by the VDM server from the virtual machine, transmission of the virtual desktop with changed policy state; and
   providing, by the VDM server to the administrator device in response to the changed policy state, management access to the selected virtual machine including the display data.

3. The computer-implemented method of claim 2, further comprising:
   transmitting, from the VDM server to the client device, a request to grant permission to share the virtual desktop display data with the administrator device.

4. The computer-implemented method of claim 2, wherein transmitting the instruction includes transmitting the instruction to an agent software program running within the virtual machine, the agent software program having permission to configure the virtual machine on behalf of the VDM server.

5. The computer-implemented method of claim 2, further comprising:
   receiving, by the VDM server from the remote client device or the administrator device, a request to terminate the sharing of the virtual desktop display data; and
   transmitting, by the VDM server to the virtual machine, an instruction to reinstate the policy indicating that the administrator device is to be prevented from accessing display data for the virtual desktop.

6. The computer-implemented method of claim 1, further comprising:
   receiving, by the VDM server, a group policy object (GPO) from a directory server; and
   transmitting, by the VDM server, the GPO to the virtual machine, wherein the GPO includes the policy state indicating that the administrator device is to be prevented from accessing display data for the virtual desktop.

7. The computer-implemented method of claim 1, wherein receiving selection of the virtual desktop comprises receiving user identification, determining an association between the user identification and the virtual desktop, and selecting the virtual desktop based upon the determined association between the user identification and the virtual desktop.

8. A non-transitory computer-readable medium storing instructions, which when executed by a processing device, cause the processing device to perform method comprising:
   receiving, by a virtual desktop management (VDM) server from an administrator device, selection of a virtual desktop;
   receiving, by the VDM server from a virtual machine, transmission of the virtual desktop, wherein the transmission of the virtual desktop includes display data representing a visual user interface for the virtual desktop running on the virtual machine, and wherein the display data is transmitted concurrently to a remote client device and to the VDM server;
   determining, by the VDM server, that the received transmission of the virtual desktop includes a policy state; and
   providing, by the VDM server to the administrator device, management access to the selected virtual machine while, in response to the detected policy state, preventing the administrator device from accessing display data for the virtual desktop running on the virtual machine.

9. The non-transitory computer-readable medium of claim 8, the method further comprising:
   receiving, by the VDM server from the client device, permission to share the virtual desktop display data with the administrator device;
   transmitting, from the VDM server in response to the received permission, an instruction to the virtual machine to change the policy state;
   receiving, by the VDM server from the virtual machine, transmission of the virtual desktop with changed policy state; and
   providing, by the VDM server to the administrator device in response to the changed policy state, management access to the selected virtual machine including the display data.

10. The non-transitory computer-readable medium of claim 9, the method further comprising:
    transmitting, from the VDM server to the client device, a request to grant permission to share the virtual desktop display data with the administrator device.

11. The non-transitory computer-readable medium of claim 9, wherein transmitting the instruction includes transmitting the instruction to an agent software program running within the virtual machine, the agent software program having permission to configure the virtual machine on behalf of the VDM server.

12. The non-transitory computer-readable medium of claim 9, the method further comprising:
   receiving, by the VDM server from the remote client device or the administrator device, a request to terminate the sharing of the virtual desktop display data; and
   transmitting, by the VDM server to the virtual machine, an instruction to reinstate the policy indicating that the administrator device is to be prevented from accessing display data for the virtual desktop.

13. The non-transitory computer-readable medium of claim 8, the method further comprising:
   receiving, by the VDM server, a group policy object (GPO) from a directory server; and
   transmitting, by the VDM server, the GPO to the virtual machine, wherein the GPO includes the policy state indicating that the administrator device is to be prevented from accessing display data for the virtual desktop.

14. The non-transitory computer-readable medium of claim 8, wherein receiving selection of the virtual desktop comprises receiving user identification, determining an association between the user identification and the virtual desktop, and selecting the virtual desktop based upon the determined association between the user identification and the virtual desktop.

15. A virtual desktop management (VDM) server comprising a processing device, wherein the processing device executes instructions that cause the VDM server to:
   receive selection of a virtual desktop from an administrator device;
   receive, from a virtual machine, transmission of the virtual desktop, wherein the transmission of the virtual desktop includes display data representing a visual user interface for the virtual desktop running on the virtual machine, and wherein the display data is transmitted concurrently to a remote client device and to the VDM server;
   determine that the received transmission of the virtual desktop includes a policy state; and
   provide, to the administrator device, management access to the selected virtual machine while, in response to the detected policy state, preventing the administrator device from accessing display data for the virtual desktop running on the virtual machine.

16. The apparatus of claim 15, wherein the instructions further cause the VDM server to:
   receive, from the client device, permission to share the virtual desktop display data with the administrator device;
   transmit, in response to the received permission, an instruction to the virtual machine to change the policy state;
   receive, from the virtual machine, transmission of the virtual desktop with changed policy state; and
   provide, to the administrator device in response to the changed policy state, management access to the selected virtual machine including the display data.

17. The apparatus of claim 16, wherein the instructions further cause the VDM server to:
   transmit, to the client device, a request to grant permission to share the virtual desktop display data with the administrator device.

18. The apparatus of claim 16, wherein transmitting the instruction includes transmitting the instruction to an agent software program running within the virtual machine, the agent software program having permission to configure the virtual machine on behalf of the VDM server.

19. The apparatus of claim 16, wherein the instructions further cause the VDM server to:
   receive, from the remote client device or the administrator device, a request to terminate the sharing of the virtual desktop display data; and
   transmit, to the virtual machine, an instruction to reinstate the policy indicating that the administrator device is to be prevented from accessing display data for the virtual desktop.

20. The apparatus of claim 15, wherein the instructions further cause the VDM server to:
   receive a group policy object (GPO) from a directory server; and
   transmit the GPO to the virtual machine, wherein the GPO includes the policy state indicating that the administrator device is to be prevented from accessing display data for the virtual desktop.

* * * * *